United States Patent
Nowack et al.

(10) Patent No.: US 9,938,411 B2
(45) Date of Patent: Apr. 10, 2018

(54) DISPERSE AZO DYES

(75) Inventors: Patric Nowack, Steinen (DE); Urs Lauk, Magstatt-le-Haut (FR); Athanassios Tzikas, Dornach (CH)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 622 days.

(21) Appl. No.: 13/991,456

(22) PCT Filed: Nov. 28, 2011

(86) PCT No.: PCT/EP2011/071170
§ 371 (c)(1),
(2), (4) Date: Jun. 4, 2013

(87) PCT Pub. No.: WO2012/084417
PCT Pub. Date: Jun. 28, 2012

(65) Prior Publication Data
US 2013/0255011 A1    Oct. 3, 2013

(30) Foreign Application Priority Data
Dec. 20, 2010  (EP) .................................... 10195956

(51) Int. Cl.
C09B 29/36 (2006.01)
D06P 1/18 (2006.01)
D06P 3/54 (2006.01)
C09B 29/42 (2006.01)

(52) U.S. Cl.
CPC ............ C09B 29/3639 (2013.01); D06P 1/18 (2013.01); D06P 3/54 (2013.01)

(58) Field of Classification Search
CPC ...... D06P 1/00; D06P 1/02; D06P 1/04; D06P 1/18; D06P 3/54; C09B 29/00; C09B 29/34; C09B 29/06; C09B 29/36; C09B 29/42; C09B 29/3639
USPC .... 8/636, 638, 639, 662, 666, 667, 670, 920
See application file for complete search history.

(56) References Cited

U.S. PATENT DOCUMENTS 3,974,123 A * 8/1976 Dehnert et al. ................. 524/84

FOREIGN PATENT DOCUMENTS

| WO | 02/059215 | | 8/2002 |
| WO | 02/059216 | | 8/2002 |
| WO | WO 02/059215 | * | 8/2002 |

* cited by examiner

*Primary Examiner* — Amina Khan

(57) ABSTRACT

The present invention relates to disperse azo dyes based on diazo components having at least one fluorine-containing substituent and an 2,6-diaminosubstituted pyridine coupling component, to a process for the preparation of such dyes and to their use in the dyeing or printing of semi-synthetic and, especially, synthetic hydrophobic fiber materials, more especially textile materials.

5 Claims, No Drawings

DISPERSE AZO DYES

CROSS REFERENCE TO RELATED APPLICATIONS

This application is the National Phase of International Application PCT/EP2011/071170 filed Nov. 28, 2011 which designated the U.S. and which claims priority to European (EP) Pat. App. No. 10195956.7 filed Dec. 20, 2010. The noted applications are incorporated herein by reference.

The present invention relates to disperse dyes based on diazo components having at least one fluorine-containing substituent, to a process for the preparation of such dyes and to their use in the dyeing or printing of semi-synthetic and, especially, synthetic hydrophobic fibre materials, more especially textile materials.

Disperse azo dyes having an aniline diazo component and an 2,6-diaminosubstituted pyridine coupling component have been known for a long time and are used in the dyeing of hydrophobic fibre materials. It has been found, however, that the dyeings or prints obtained using the dyes known at present do not in all cases meet current requirements of the automotive industry, especially with regard to their fastness to light properties, in particular their hot light fastness.

It has now been found, surprisingly, that the dyes according to the invention meet the criteria mentioned above to a great extent.

The present invention accordingly relates to disperse dyes that yield dyeings having very good fastness to light and, in addition, exhibit good build-up both in the exhaust and thermosol processes and in textile printing.

The dyes according to the invention correspond to formula

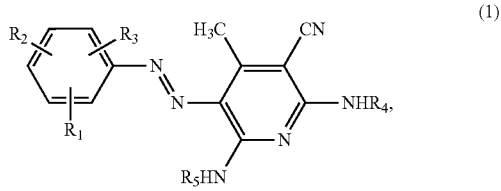

(1)

wherein $R_1$ is fluoro, trifluoromethyl, trifluoromethoxy or trifluoromethylsulfonyl, $R_2$ and $R_3$ each independently of the other represent hydrogen, $C_1$-$C_{12}$alkyl, $C_1$-$C_{12}$alkoxy, halogen, cyano, nitro, trifluoromethyl or —$COOR_6$, wherein $R_6$ is $C_1$-$C_{12}$alkyl unsubstituted or substituted by one or more $C_1$-$C_{12}$alkoxy groups, hydroxyl groups, amino groups or halogen atoms.

$R_4$ and $R_5$ denote hydrogen or phenyl that is unsubstituted or substituted with one or more $C_1$-$C_{12}$alkyl, $C_1$-$C_{12}$alkoxy or trifluoromethyl groups, with the proviso that one of the radicals $R_4$ and $R_5$ is hydrogen and the other is unsubstituted or substituted phenyl, and with the proviso that in case $R_1$ represents trifluoromethyl in ortho-position to the azo group, at least one of $R_2$ and $R_3$ is not hydrogen.

When any of the radicals $R_1$, $R_2$ or $R_6$ or any of the substituents of $R_4$ or $R_5$ is alkyl, that radical or those radicals may be straight-chain or branched. Examples of alkyl groups are methyl, ethyl, n-propyl, isopropyl, n-butyl, isobutyl, sec-butyl, tert-butyl, n-pentyl, neopentyl, n-hexyl, n-heptyl, n-octyl, isooctyl, n-decyl and n-dodecyl.

Substituted alkyl groups are, for example, 2-hydroxyethyl, 2-hydroxypropyl, 4-hydroxybutyl, 2-aminoethyl, 2-aminopropyl, 4-aminobutyl, cyanomethyl, 2-cyanoethyl, 2-chloroethyl, 2-bromoethyl and 4-chlorobutyl.

Examples of alkoxy groups are methoxy, ethoxy, n-propoxy, isopropoxy, n-butoxy, isobutoxy, sec-butoxy, tert-butoxy, n-pentyloxy, neopentyloxy, n-hexyloxy, n-heptyloxy, n-octyloxy, isooctyloxy, n-decyloxy and n-dodecyloxy.

Suitable halogen substituents are fluorine and especially chlorine and bromine.

In formula (1), $R_1$ is preferably fluoro or trifluoromethyl.

Also preferred are dyes of formula (1) wherein $R_2$ and $R_3$ denote hydrogen, fluoro, chloro, bromo, cyano or nitro.

In formula (1), $R_4$ and $R_5$ preferably denote hydrogen or phenyl substituted with trifluoromethyl, n-propyl, n-butyl or n-butoxy.

Preference is given to dyes of formula (1) represented by formula

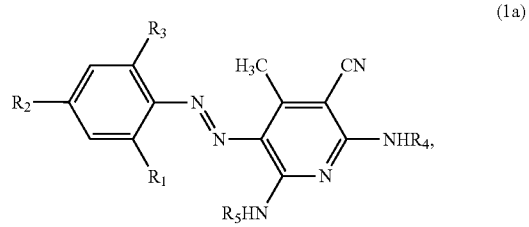

(1a)

wherein $R_1$ is fluoro or trifluoromethyl,
$R_2$ denotes fluoro, chloro, bromo or nitro,
$R_3$ represents hydrogen, bromo, cyano or nitro, and
$R_4$ and $R_5$ are as defined above.
$R_4$ and $R_5$ in formula (1a) are preferably hydrogen or phenyl.

The invention relates also to a process for the preparation of an azo dye of formula (1) as defined above, wherein a compound of formula

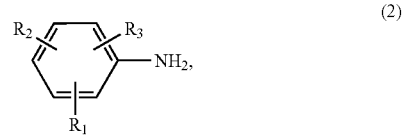

(2)

wherein $R_1$, $R_2$ and $R_3$ are as defined above,
is diazotised in accordance with a customary procedure and then coupled to a coupling component of formula

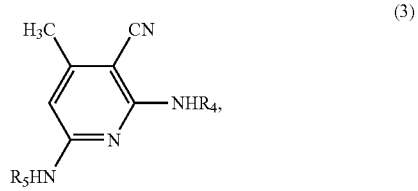

(3)

wherein $R_4$ and $R_5$ are as defined above.

The anilines of formula (2) are known or can be prepared according to known methods. Some are commercially available.

Suitable anilines of formula (2) are, for example, 3-trifluoromethyl-6-methylaniline, 3-trifluoromethyl-4-methylaniline, 2-chloro-4-trifluoromethoxyaniline, 2-chloro-4-trifluoromethylaniline, 2-chloro-5-trifluoromethylaniline, 4-chloro-2-trifluoromethylaniline, 4-chloro-3-trifluoromethylaniline, 3,5-bis-(trifluoromethyl)aniline, 3-trifluoromethyl-4-cyanoaniline, 3-trifluoromethyl-4-nitroaniline, 2-bromo-4-trifluoromethoxyaniline, 4-bromo-2-trifluoromethoxyaniline, 2-bromo-4-trifluoromethylaniline, 2-bromo-5-trifluoromethylaniline, 4-bromo-2-trifluoromethylaniline, 4-bromo-3-trifluoromethylaniline, 2-fluoro-3-trifluoromethylaniline, 2-fluoro-5-trifluoromethylaniline, 2-fluoro-6-trifluoromethylaniline, 4-fluoro-2-trifluoromethylaniline, 4-fluoro-3-trifluoromethylaniline, 2-nitro-4-trifluoromethylaniline, 3-nitro-6-trifluoromethylaniline, 4-nitro-2-trifluoromethylaniline, 2,4-dinitro-6-trifluoromethylaniline, 2-bromo-4-nitro-6-trifluoromethylaniline and 2-cyano-4-nitro-6-trifluoromethylaniline The coupling components of formula (3) are likewise known or are obtainable by known methods, for example by the process described in U.S. Pat. No. 3,853,895.

According to this process, 2,6-dichloro-3-cyano-4-methylpyridine is successively reacted with ammonia and an optionally substituted aniline. Due to the different reactivities of both chlorine atoms in the educt, two isomeric products are usually obtained.

For example, reaction of 2,6-dichloro-3-cyano-4-methylpyridine with aniline in the first step yields a mixture of 2-phenylamino-3-cyano-4-methyl-6-chloropyridine and 2-chloro-3-cyano-4-methyl-6-phenylaminopyridine.

Accordingly, the final product obtained by subsequent reaction with ammonia mainly consists of 2-phenylamino-3-cyano-4-methyl-6-aminopyridine and 2-amino-3-cyano-4-methyl-6-phenylaminopyridine in the same ratio of isomers.

The invention therefore also relates to dye mixtures comprising at least two structurally different azo dyes of formula (1) according to claim 1.

The diazotisation is carried out in a manner known per se, for example with sodium nitrite in an acidic, e.g. hydrochloric-acid-containing or sulfuric-acid-containing, aqueous medium. The diazotisation may, however, also be carried out using other diazotisation agents, for example using nitrosylsulfuric acid. In the diazotisation, an additional acid may be present in the reaction medium, for example phosphoric acid, sulfuric acid, acetic acid, propionic acid or hydrochloric acid or a mixture of such acids, for example a mixture of propionic acid and acetic acid. The diazotisation is advantageously carried out at temperatures of from −10 to 30° C., for example from −10° C. to room temperature.

The coupling of the diazotised compound to the coupling component of formula (3) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The present invention relates also to dye mixtures comprising at least one dye of formula (1) and at least one dye other than of formula (1).

Suitable dyes which can advantageously be mixed with the dyes of formula (1) according to the invention are, for example, C.I. Disperse Yellow 42, C.I. Disperse Yellow 51. C.I. Disperse Yellow 65, C.I. Disperse Yellow 251, C.I. Solvent Yellow 163, C.I. Disperse Orange 157, Palanil Red FFB, C.I. Disperse Red 55, C.I. Disperse Red 55:1, C.I. Disperse Red 59, C.I. Disperse Red 60, C.I. Disperse Red 75, C.I. Disperse Red 86, C.I. Disperse Red 91, C.I. Disperse Red 92, C.I. Disperse Red 133, C.I. Disperse Red 146, C.I. Disperse Red 191, C.I. Disperse Red 279, C.I. Disperse Red 302, C.I. Disperse Red 302:1, C.I. Disperse Red 380, C.I. Disperse Red 381, C.I. Disperse Red 385, C.I. Disperse Violet 57, C.I. Disperse Blue 27, C.I. Disperse Blue 54, C.I. Disperse Blue 56, C.I. Disperse Blue 60, C.I. Disperse Blue 77 and C.I. Disperse Blue 379.

The dye mixtures according to the invention can be prepared, for example, by simply mixing the individual dyes.

The amount of the individual dyes in the dye mixtures according to the invention can vary within a wide range.

The dye mixtures according to the invention advantageously contain at least 10% by weight, preferably at least 20% by weight and especially at least 40% by weight, of one or more dyes of formula (1).

The dyes and dye mixtures according to the invention can be used in the dyeing or printing of semi-synthetic and, especially, synthetic hydrophobic fibre materials, more especially textile materials. Textile materials composed of blends that contain such semi-synthetic and/or synthetic hydrophobic fibre materials can likewise be dyed or printed using the dyes or dye mixtures according to the invention.

Semi-synthetic fibre materials that come into consideration are especially cellulose 2½ acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, for example those of $\alpha,\alpha$-dimethyl-4,4-dihydroxy-diphenylmethane and phosgene, and of fibres based on polyvinyl chloride and on polyamide.

The application of the dyes and dye mixtures according to the invention to the fibre materials is effected in accordance with known dyeing procedures. For example, polyester fibre materials are dyed in the exhaust process from an aqueous dispersion in the presence of customary anionic or non-ionic dispersants and optionally customary swelling agents (carriers) at temperatures of from 80 to 140° C. Cellulose 2% acetate is dyed preferably at from 65 to 85° C. and cellulose triacetate at temperatures of from 65 to 115° C.

The dyes and dye mixtures according to the invention will not colour wool and cotton present at the same time in the dyebath or will colour such materials only slightly (very good reservation), so that they can also be used satisfactorily in the dyeing of polyester/wool and polyester/cellulosic fibre blend fabrics.

The dyes and dye mixtures according to the invention are suitable for dyeing in accordance with the thermosol process, in the exhaust process and for printing processes.

The said fibre materials can be in a variety of processing forms, e.g. in the form of fibres, yarns or non-wovens, in the form of woven fabrics or knitted fabrics.

It is advantageous to convert the dyes and dye mixtures according to the invention into a dye preparation prior to use. For that purpose, the dye is ground so that its particle size is on average from 0.1 to 10 microns. The grinding can be carried out in the presence of dispersants. For example, the dried dye is ground with a dispersant or is kneaded in paste form with a dispersant and then dried in vacuo or by atomisation. The preparations so obtained can be used, after the addition of water, to prepare print pastes and dyebaths.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The dyes and dye mixtures according to the invention impart to the mentioned materials, especially to polyester materials, level colour shades having very good in-use fastness properties, such as, especially, good fastness to light, to thermofixing, to pleating, to chlorine and to wetting, such as fastness to water, to perspiration and to washing; the finished dyeings are also distinguished by very good fastness to rubbing. Special mention should be made of the good fastness properties of the resulting dyeings in respect of light, especially hot light.

The dyes and dye mixtures according to the invention can also be used satisfactorily in the preparation of mixed shades together with other dyes.

The dyes and dye mixtures according to the invention are also very suitable for dyeing hydrophobic fibre materials from supercritical $CO_2$.

The present invention relates also to the above-mentioned use of the dyes and dye mixtures according to the invention as well as to a process for the dyeing or printing of semi-synthetic or synthetic hydrophobic fibre materials, especially textile materials, wherein a dye according to the invention is applied to the said materials or is incorporated into those materials. The said hydrophobic fibre materials are preferably textile polyester materials. Further substrates that can be treated by the process according to the invention as well as preferred process conditions can be found above in the detailed description of the use of the dyes according to the invention.

The invention relates also to hydrophobic fibre materials, especially polyester textile materials, dyed or printed by the said process.

The dyes according to the invention are also suitable for modern reproduction processes, for example thermotransfer printing.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimeters.

I. PREPARATION EXAMPLES

Example I.1

A. Diazotisation 10.67 g of 1M-nitrosylsulfuric acid are placed in a laboratory reaction apparatus. At 15-20° C., 3.2 g of 2,4-dibromo-6-trifluoromethylaniline are introduced. After being stirred for 2 hours at 15-20° C., the mixture is poured into 80 g of ice-water and stirred for a further 10 min. The excess nitrite is destroyed by addition of sulfamic acid.

B. Coupling 2.3 g of a mixture of 2-phenylamino-3-cyano-4-methyl-6-aminopyridine and 2-amino-3-cyano-4-methyl-6-phenylaminopyridine in 40 ml of 80% acetic acid are placed in a laboratory reaction apparatus and 2 drops of Surfynol 104 E (2,4,7,9-tetramethyl-5-decyne-4,7-diol) are added thereto. After addition of 30 g of ice, the solution of the diazonium salt prepared under A is slowly added dropwise so that the internal temperature is <15° C. The mixture is stirred for 1 hour, while the temperature is kept <15° C. by addition of ice and pH is adjusted to 3.0 to 3.5 by addition of 30% NaOH. After heating to 50° C., the mixture is stirred for 30 min and afterwards the solid is filtered off with suction, washed with deionised water and dried. 4.8 g (8.6 mmol, 86% yield) of a mixture of golden yellow dyes of formulae (101a) and (101b) is obtained.

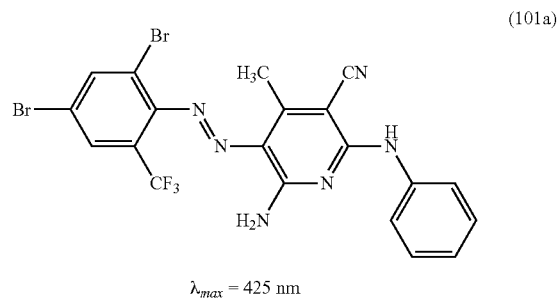

(101a)

$\lambda_{max} = 425$ nm

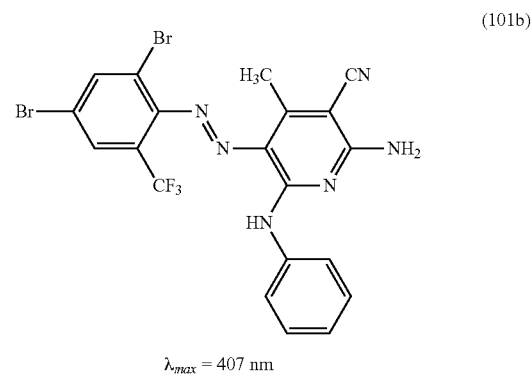

(101b)

$\lambda_{max} = 407$ nm

Example 1.2

A. Diazotation 3.2 g of 2-chloro-5-trifluoromethylaniline are dissolved in 20 g of 50% sulfuric acid at room temperature. 0.1 g of ice and 5.55 g of 1M-nitrosylsulfuric acid are added under stirring. After being stirred for 5 hours at 15-20° C., the mixture is poured into 65 ml of acetic acid and stirred for a further 10 min. The excess nitrite is destroyed by addition of 0.5 g of sulfamic acid.

B. Coupling 3.58 g of a mixture of 2-phenylamino-3-cyano-4-methyl-6-aminopyridine and 2-amino-3-cyano-4-methyl-6-phenylaminopyridine are added to at 5° C. to a solution of 0.5 g of Surfynol 104 E (2,4,7,9-tetramethyl-5-decyne-4,7-diol) and 0.5 g of Baykanol® (dispersing agent, supplied by Lanxess) in 65 ml of 80% acetic acid. The solution of the diazonium salt prepared under A is slowly added dropwise under cooling so that the internal temperature is 0-5° C. Subsequently, the mixture is stirred until the internal temperature is about room temperature and afterwards the solid is filtered off with suction, washed with deionised water and dried. 6.1 g (14 mmol, 88% yield) of a mixture of dyes of formulae (102a) and (102b) is obtained.

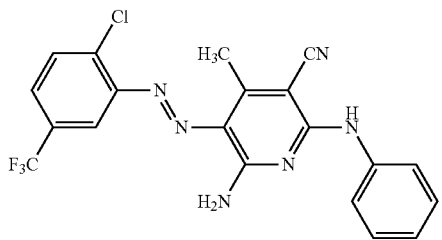
(102a)
λ_max = 458 nm
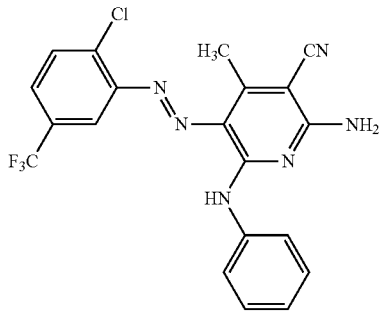
(102b)
λ_max = 432 nm
The dyes (102)-(106) listed in Table 1 are prepared analogously to the process described in Example I.1.
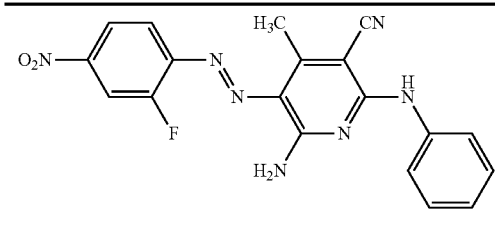
(103a)
λ_max = 498 nm
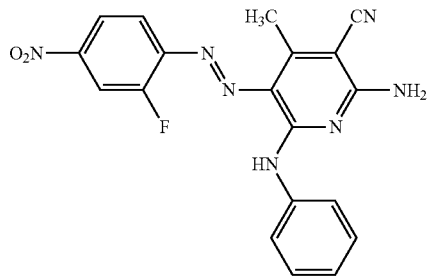
(103b)
λ_max = 480 nm
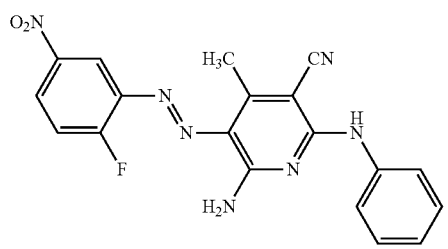
(104a)
λ_max = 464 nm
-continued
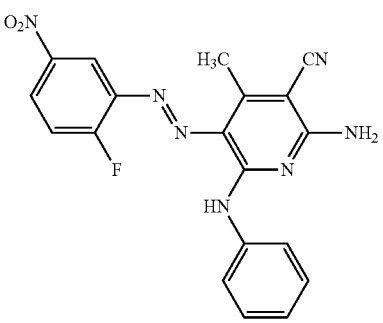
(104b)
λ_max = 440 nm
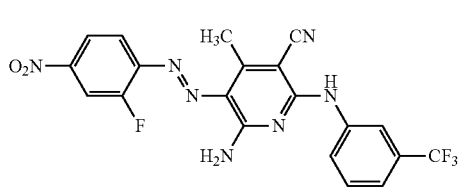
(105a)
λ_max = 490 nm
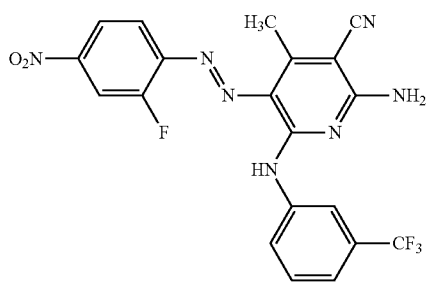
(105b)
λ_max = 460 nm
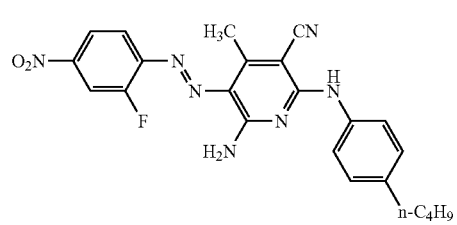
(106a)
λ_max = 502 nm
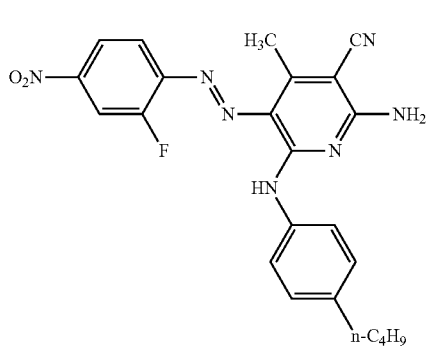
(106b)
λ_max = 486 nm -continued
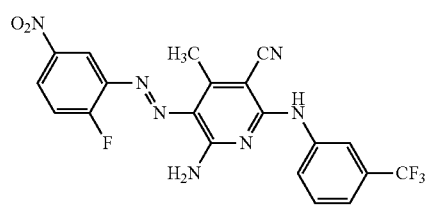
(107a)
λ_max = 426 nm
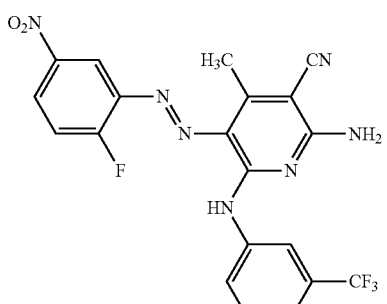
(107b)
λ_max = 458 nm
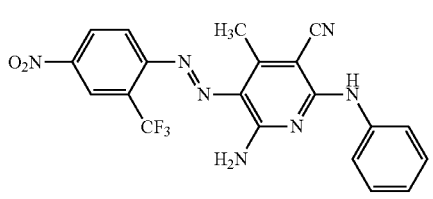
(108a)
λ_max = 485 nm
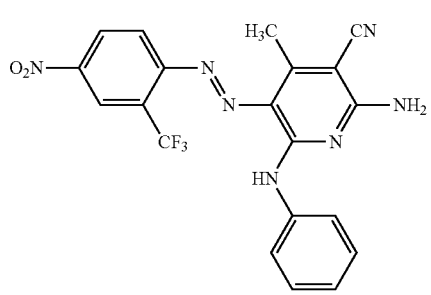
(108b)
λ_max = 480 nm
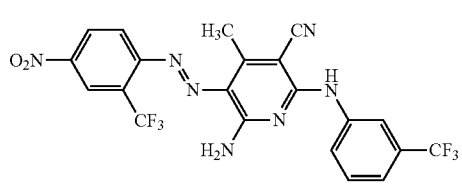
(109a)
λ_max = 474 nm
-continued
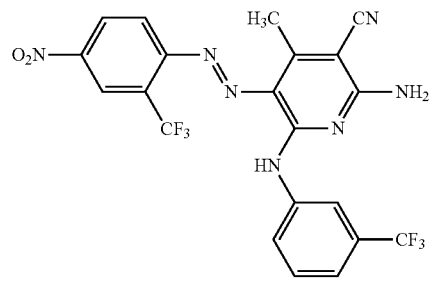
(109b)
λ_max = 467 nm
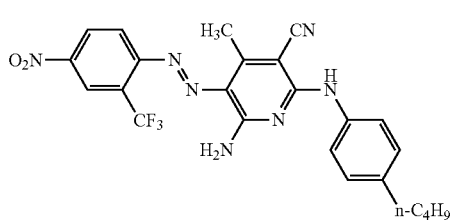
(110a)
λ_max = 503 nm
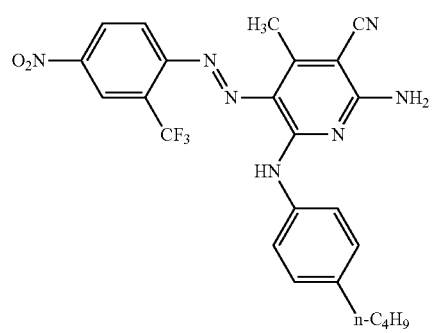
(110b)
λ_max = 495 nm
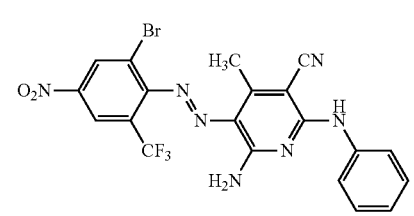
(111a)
λ_max = 463 nm
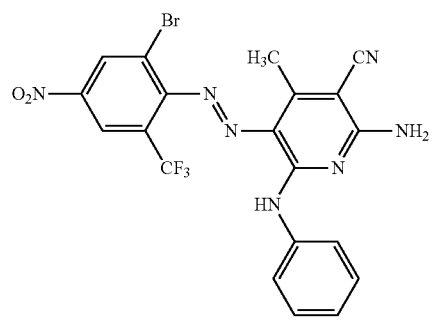
(111b)
λ_max = 441 nm

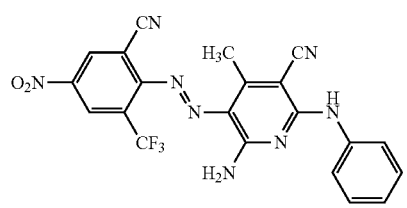
(113a)
λ_max = 475 nm
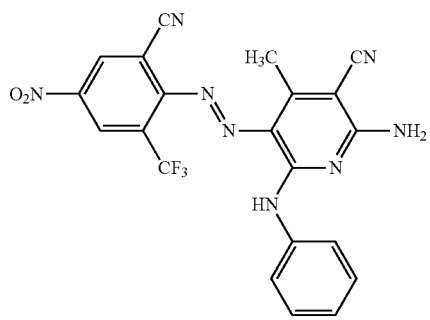
(113b)
λ_max = 456 nm
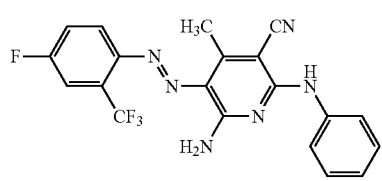
(114a)
λ_max = 426 nm
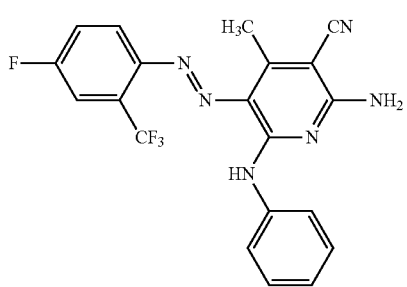
(114b)
λ_max = 403 nm
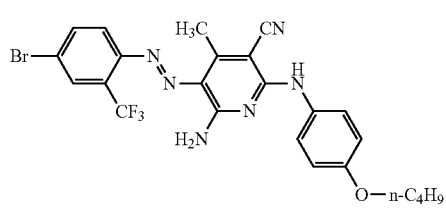
(115a)
λ_max = 437 nm
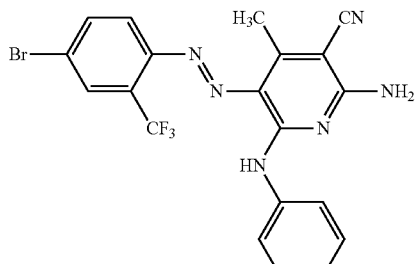
(115b)
λ_max = 430 nm
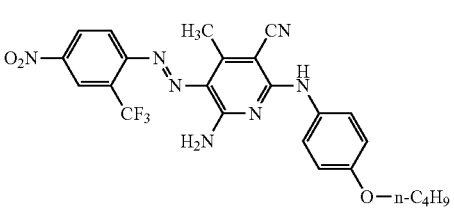
(116a)
λ_max = 515 nm
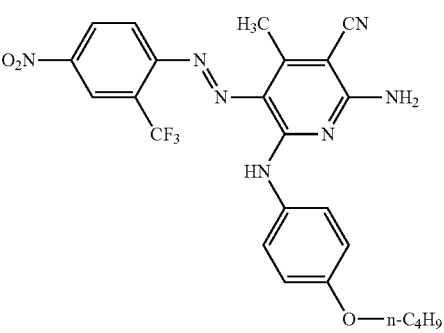
(116b)
λ_max = 504 nm
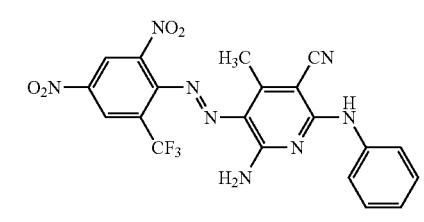
(117a)
λ_max = 545 nm
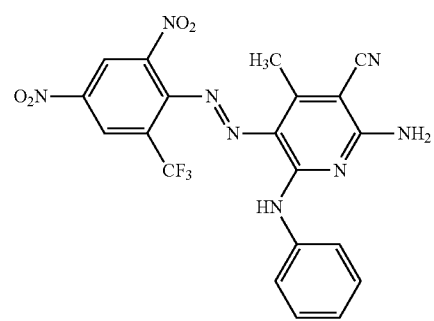
(117b)
λ_max = 532 nm

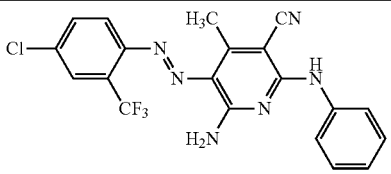
(118a)
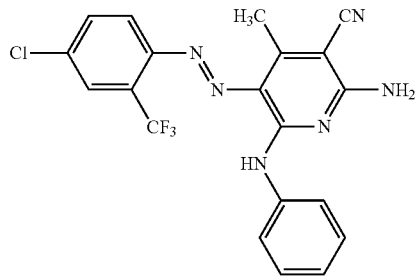 [SMILES: Cc1c(C#N)c(N)nc(Nc2ccccc2)c1/N=N/c1ccc(Cl)cc1C(F)(F)F]
(118b)
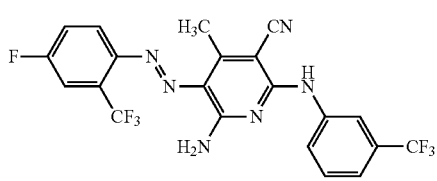
(119a)
λ$_{max}$ = 419 nm
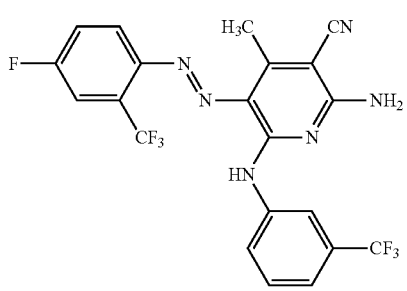
(119b)
λ$_{max}$ = 413 nm
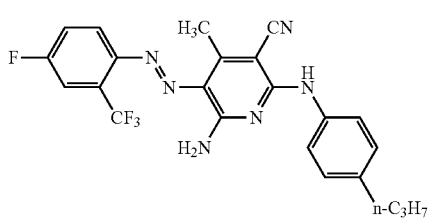
(120a)
λ$_{max}$ = 430 nm
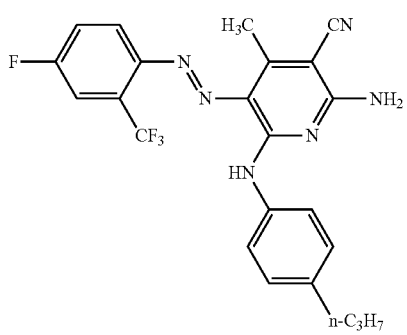
(120b)
λ$_{max}$ = 421 nm
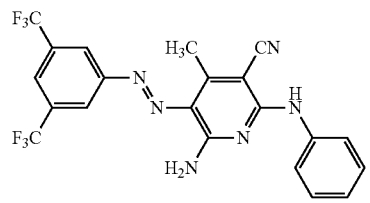
(121a)
λ$_{max}$ = 465 nm
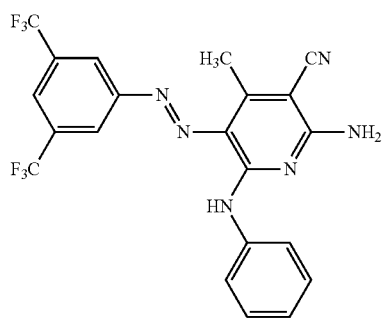
(121b)
λ$_{max}$ = 450 nm
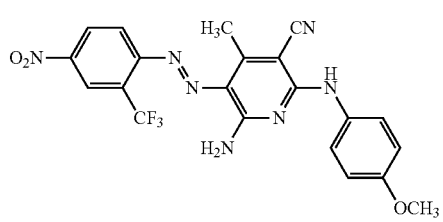
(122a)
λ$_{max}$ = 496 nm
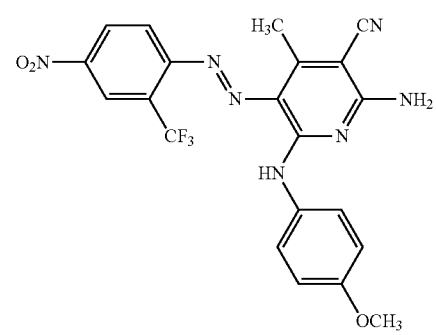
(122b)
λ$_{max}$ = 482 nm
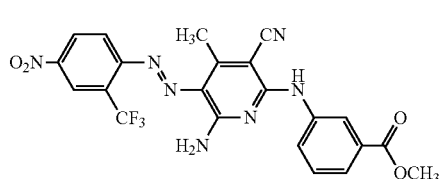
(123a)
λ$_{max}$ = 488 nm -continued
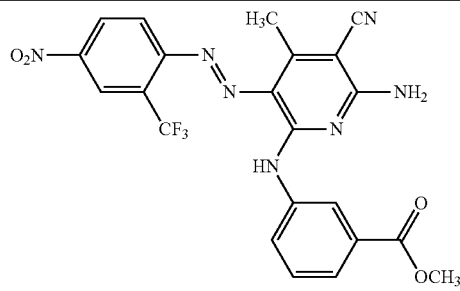
(123b)
λ_max = 480 nm
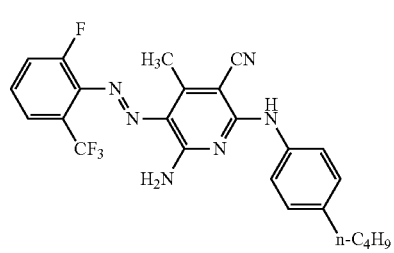
(124a)
λ_max = 416 nm
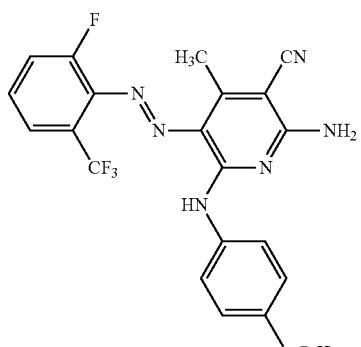
(124b)
λ_max = 404 nm
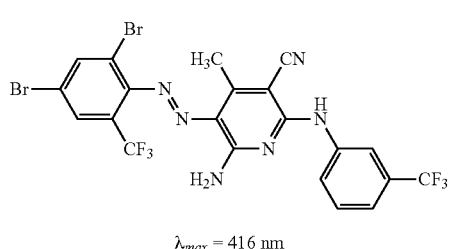
(125a)
λ_max = 416 nm
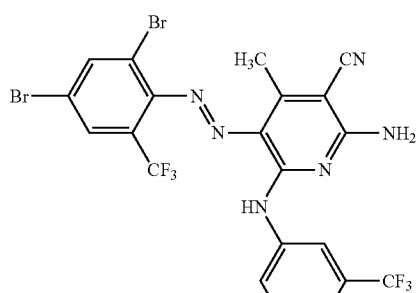
(125b)
λ_max = 404 nm
-continued
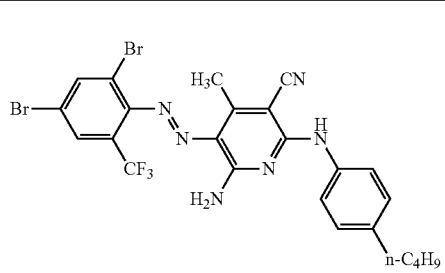
(126a)
λ_max = 428 nm
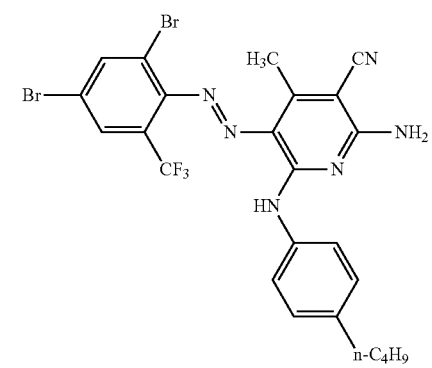
(126b)
λ_max = 412 nm
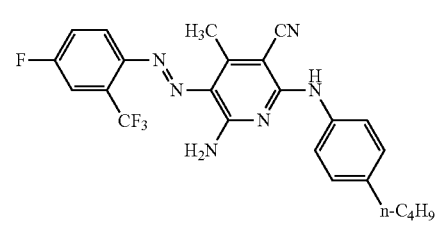
(127a)
λ_max = 432 nm
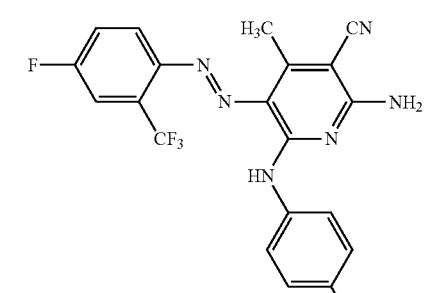
(127b)
λ_max = 426 nm
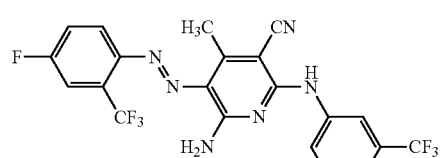
(128a)
λ_max = 428 nm -continued
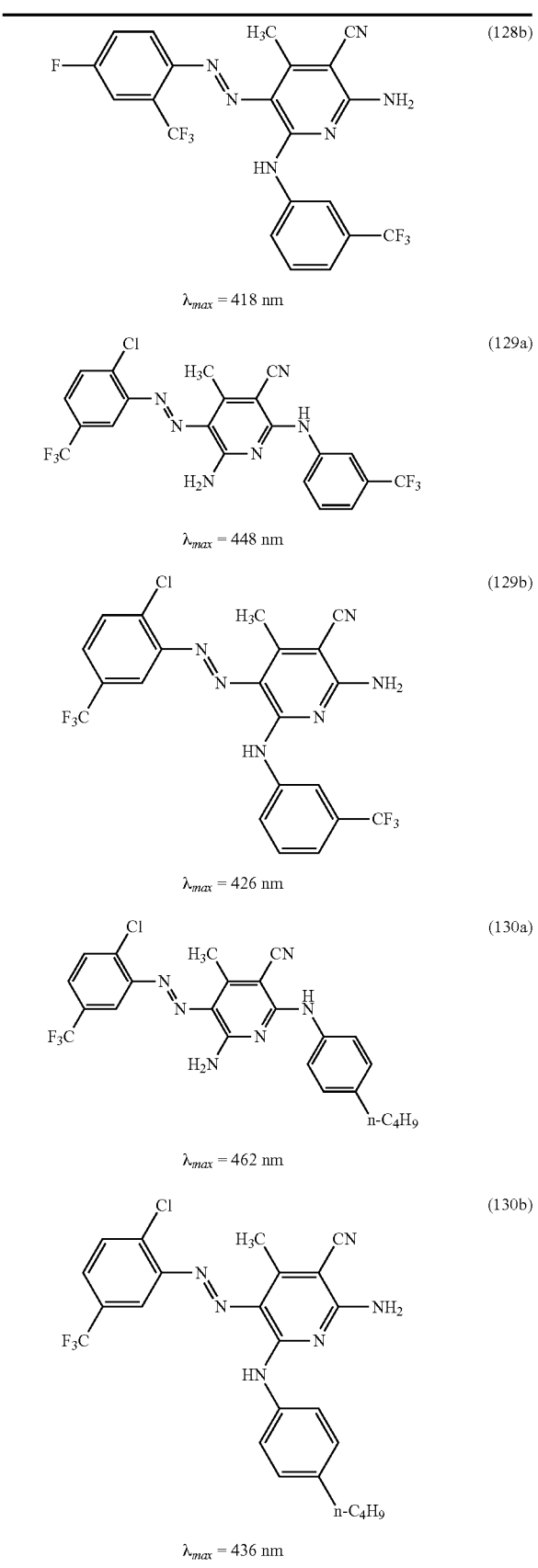
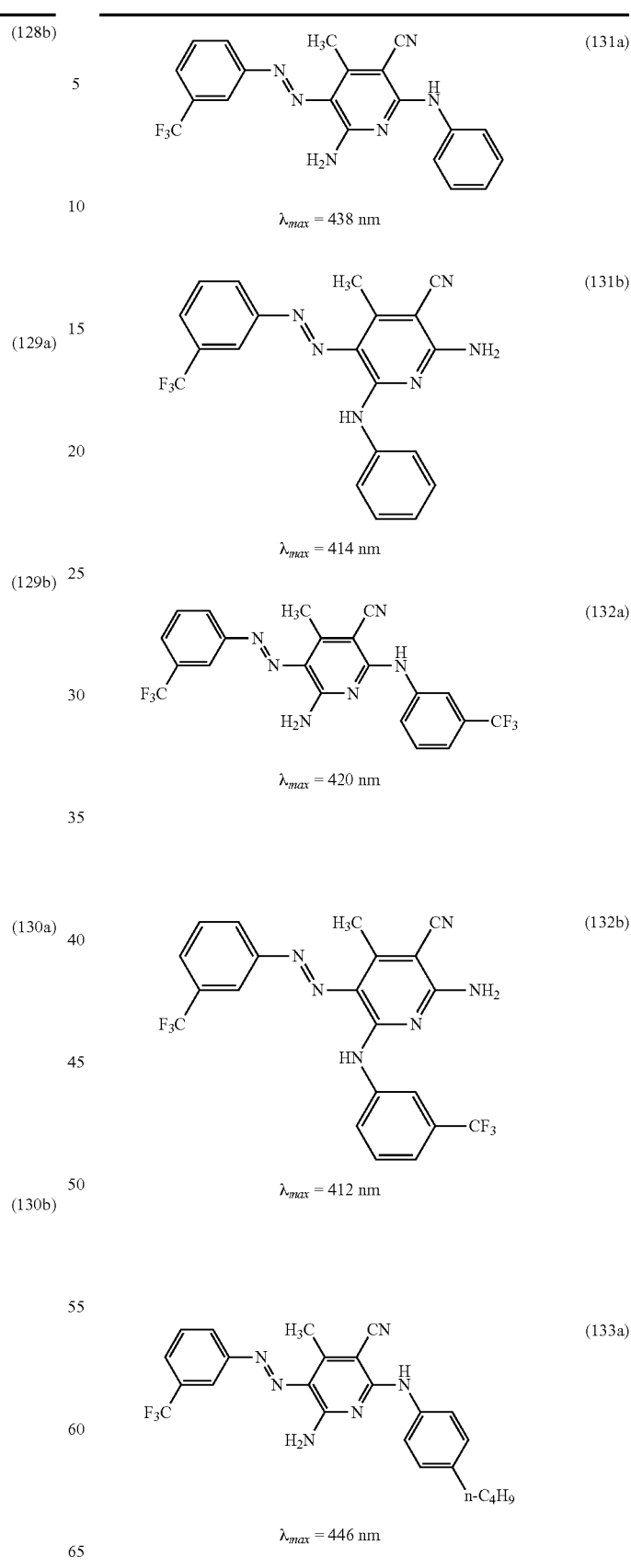

-continued

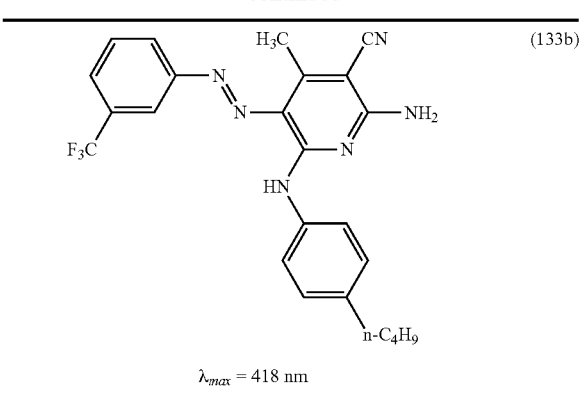

(133b)

λ_max = 418 nm

II. APPLICATION EXAMPLES

Example II. 1

Samples of a polyester fabric are dyed in a high-temperature exhaust process at 135° C. in a dyebath containing 1% of one of the dyes (101)-(105). The resulting dyeings exhibit values in respect of light fastness of ≥6.

What is claimed is:
1. A dye of formula

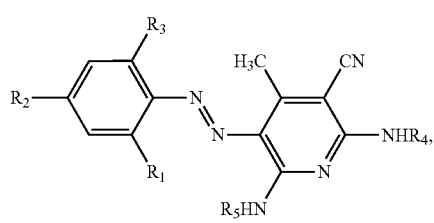

(1a)

wherein $R_1$ is trifluoromethyl,
$R_2$ denotes nitro,
$R_3$ represents hydrogen,
$R_4$ is phenyl and
$R_5$ is hydrogen.
2. A process for the preparation of an azo dye of formula (1) according to claim 1, wherein a compound of formula

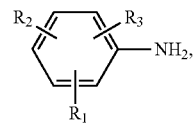

(2)

wherein $R_1$, $R_2$ and $R_3$ are as defined in claim 1, is diazotised and then coupled to a coupling component of formula

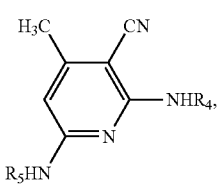

(3)

wherein $R_4$ and $R_5$ are as defined in claim 1.
3. A dye mixture comprising a dye of formula (1a) according to claim 1 and a dye of formula (1b)

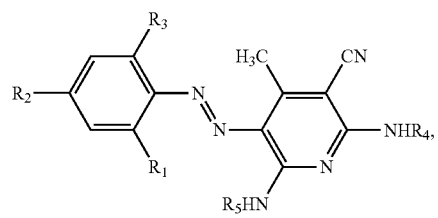

(1b)

wherein $R_1$ is trifluoromethyl,
$R_2$ denotes nitro,
$R_3$ represents hydrogen,
$R_4$ is hydrogen and
$R_5$ is phenyl.
4. A process for the dyeing or printing of a semi-synthetic or synthetic hydrophobic fibre material, wherein a dye of formula (1a) according to claim 1 is applied to the said material or is incorporated into that material.
5. A process for the dyeing or printing of a sung-synthetic or synthetic hydrophobic fibre material, wherein a dye mixture according to claim 3 is applied to the said material or is incorporated into that material.

* * * * *